United States Patent [19]

Blanchard

[11] 4,334,552

[45] Jun. 15, 1982

[54] DIVERTER VALVE

[75] Inventor: Robert Blanchard, Brusly, La.

[73] Assignee: HR Textron Inc., Valencia, Calif.

[21] Appl. No.: 139,307

[22] Filed: Apr. 11, 1980

[51] Int. Cl.³ .......................... F16K 11/06; F16K 3/18
[52] U.S. Cl. ............................... 137/625.48; 251/176; 251/368
[58] Field of Search ...................... 137/625.48, 625.25; 251/368, 193, 157, 158, 176; 148/31.5

[56] References Cited

U.S. PATENT DOCUMENTS

| | | | |
|---|---|---|---|
| 1,855,913 | 4/1932 | Hueber et al. | 137/625.25 |
| 2,950,737 | 8/1960 | Hendrix | 137/625.48 |
| 2,951,505 | 9/1960 | Hare . | |
| 3,021,823 | 2/1962 | Dinkelkamp | 137/625.48 X |
| 3,521,674 | 7/1970 | Dodson et al. | 251/176 X |
| 3,661,357 | 5/1972 | Armstrong et al. | 251/176 X |
| 3,683,965 | 8/1972 | McClure et al. | 251/368 X |
| 3,960,361 | 6/1976 | York | 251/368 X |
| 4,131,492 | 12/1978 | Fushimi et al. | 148/31.5 X |
| 4,204,886 | 5/1980 | Bens | 148/31.5 X |

FOREIGN PATENT DOCUMENTS 52-63812  5/1977  Japan ................................. 148/31.5
672963  5/1952  United Kingdom .

*Primary Examiner*—Arnold Rosenthal
*Attorney, Agent, or Firm*—Nilsson, Robbins, Dalgarn, Berliner, Carson & Wurst

[57] ABSTRACT

Generally disclosed is a filtration system including a pair of filters having a pair of diverter valves connected at the input and output thereof for controlling the flow of viscous fluids through one of the other of the filters. More specifically, there is disclosed a diverter valve for controlling viscous fluid flow at the input and output of the filters. The diverter valve is a slide valve which provides a fluid flow path which has no isolated flow areas subject to stagnation. The diverter valve is constructed of a slide plate sandwiched between a manifold block and a backing plate. The slide plate defines a passageway which mates with ports provided in a sealing surface of the manifold block so that a continuous flow path is provided between inlet and outlet of the diverter valve. Sealing pressure is maintained between the slide plate and the manifold block by a plurality of tie bolts urging the slide plate into contact with the manifold block.

15 Claims, 5 Drawing Figures

DIVERTER VALVE

BACKGROUND OF THE INVENTION

1. Field of the Invention

This invention relates to a plastic filtration system for removing contaminants before product formation and more specifically to a diverter valve for directing the flow of viscous materials between alternate filters.

2. Description of the Prior Art

For a variety of manufacturing processes involving use of process fluids, such as "hot melts" and fluid monomer and polymer feed stocks, for example, nylon and polyesters, it is desirable to operate on a continuous flow basis. Such processes typically embody extrusion, injection, blow molding, coating and spraying techniques, for example, in the manufacture of synthetic textile fibers, plastic tubing, plastic sheets and films and protective or insulating coatings for electrical wires.

In such processes, it is common practice to include a filter unit in the flow stream to effect removal of impurities which might result in an imperfect product or cause clogging of downstream equipment such as spinnerettes or extrusion dies. As is obvious, filters must be cleaned or replaced periodically. Thus, to permit uninterrupted operation two parallel filter units (each of which may consist of more than one filter element) are provided together with changeover or diverter valves for alternatively diverting flow from one filter unit to the other so that one unit is in service while the other is being cleaned or replaced. It is usually desirable in such processes that filter changeover be accomplished without any significant reduction in process fluid flow or pressure to downstream equipment and without introducing air to the flow stream.

A major problem in successfully developing a system of the type above-referred to is to provide diverter valves which will operate reliably at the pressures (approximately 5000 PSI) and at the high temperatures (approximately 600 degrees Fahrenheit or more) within the highly corrosive environment provided by the materials being processed.

For the most part, the prior art diverter valves have used a rotary plug valve or a variation thereof to control the flow of the material being processed. Such valves comprise a circular or conical plug which fits within a mating opening provided in the valve body with the plug containing flow ports requiring critical matching to obtain the desired flow. Such rotary plug valves, when subjected to the pressures and temperatures required, have a tendency to freeze or seize up. If critical matching does not occur or a leak does occur, there is no possibility for the surface between the body and plug to be forced together to cure the defect. Some examples of such rotary plug prior art valves are found in U.S. Pat. Nos. 3,033,256, 3,059,276, 3,193,877, 3,243,849, 3,455,357, 3,480,706, 3,503,096, 3,679,060, 3,935,108, and 3,940,222.

In some instances in the prior art, slide plates have been utilized in order to divert the flow of the material being processed. However, such slide plates, as provided in the prior art, typically require non-metallic resilient seals to control or prevent leakage. Such seals again will not withstand high temperatures and pressures for long periods of time, thus providing a valve which is not reliable except for extremely short periods or in a different environment. Some examples of devices utilizing slide plates of various types within a plastic filtration system are shown by the following U.S. Pat. Nos. 2,661,497, 2,763,308, 2,786,504, 3,007,199, 3,059,276, 3,112,525, 3,145,746 and 3,503,096. In addition thereto, various slider valves have been known for a long period of time for diverting fluid flow for various other purposes. Some patents directed to such structures issued in the United States are as follows: U.S. Pat. Nos. 444,438, 994,544, 1,855,913, 1,930,827, 3,089,512, 3,103,233, and in addition thereto attention is called to British Pat. No. 845,187, the complete specification of which was published Aug. 17, 1960.

It has been suggested that a spool valve may be utilized to overcome some of the prior art problems. See U.S. Pat. No. 3,833,121. Although such a valve does overcome some of the problems, there is nonetheless a remaining problem evident in the spool valve, as well as in many of the prior art valves of the rotary, plug or slide plate types. That is, the construction in the flow areas through which the material being processed must move define isolated areas which are subject to stagnation. That is, the material being processed will move into these isolated areas and remain there. Depending upon the type of material involved, degradation will occur with extremely deleterious effects on the material being processed. For example, if polyvinyl chloride is being processed, the stagnant material will form hydrochloric acid and carbon and will then commence to increase in size (grow) until it extends into the flow of the material being processed and breaks off and contaminates the entire process. If other types of materials, such as polyethylene are being processed, the material will become cross-linked or carbonized in the stagnant area and will cause gels to form.

It is thus an extremely important feature to provide a diverter valve for controlling the flow between the filters of the material being processed that will not generate or provide any isolated areas into which the material being processed may flow and there stagnate. Such must be provided while still providing a valve which will operate reliably over long periods of time at the high pressures and high temperatures encountered with those materials and will not seize up or leak and which may be readily operated when desired while still providing the ability to easily and readily service the same should such be required.

Other prior art U.S. Patents relating generally to the art and known to applicant are U.S. Pat. Nos. 3,501,806, 3,145,746, 3,353,211, 3,488,806, 3,480,706, 3,727,767, 2,095,064, 3,396,845, 2,709,451, 3,025,873, 2,307,585, 3,135,284, 3,643,692, 3,746,481, 3,817,668, 2,039,858, 2,186,266, 2,709,451 and 3,154,485.

SUMMARY OF THE INVENTION

A slide plate diverter valve for use with high viscosity fluids at temperatures in excess of about 400 degrees Fahrenheit and pressures in excess of about 1000 PSI, includes a metallic manifold block defining inlet and outlet ports with a metallic slide plate having a fluid flow passageway in one surface thereof receiving the fluid flowing through the ports to provide a continuous flow path for the fluid with the flow path having no isolated regions subject to stagnation.

A diverter valve constructed in accordance with more specific features of the present invention, includes a manifold body defining inlet and outlet ports along with a slide plate having a cavity or recess defined therein and dimensioned to span the inlet flow port and one of the outlet flow ports simultaneously. By thus moving the slide plate between two limit positions provided for it, the material being processed may be caused to flow from the inlet port to either of the selected outlet ports and thus to the desired filter. A backing plate is provided to maintain the slide plate in contact with the manifold block at all times. A plurality of clamping or tie rods extend between the backing plate and the manifold block and are adjustable to apply a clamping pressure between the engaging surfaces of the manifold block and the slide plate to effect a seal therebetween. The only seal provided is the metal-to-metal seal existing between the mutually engaging surfaces of the slide plate and the manifold block.

To provide the desired metal characteristics for obtaining the desired metal-to-metal seals, the surfaces which are mutually engaging and which provide the seal must be extremely hard, flat, and have a smooth finish. In the prior art to obtain the desired hardness, hot work tool steel has been utilized as the starting material. However, to provide the desired hardness in the surfaces and the desired tempering the material is carburized, utilizing the old and well-known carburizing process. Although such material when carburized does operate quite well, after subjection to the high temperatures (in excess of 400 degress Fahrenheit) required in applications for which the diverter valve of the present invention are desired, it has been found that the carburized material begins to temper further and as a result thereof the valve galls and freezes up.

To overcome this problem, the surfaces of the present valve which are mutually engaging to provide the seals are subjected to a nitriding process. The nitriding process which is preferred is the well-known Floe process and the hot work tool steel after being appropriately hardened and tempered is subjected to the nitriding process for a time sufficient to cause approximately a 10 mil penetration of the nitriding into the surface of the material although such is not critical. It has been found that through utilization of the nitriding process, the valve of the present invention even when subjected to high temperatures (600 to 700 degrees Fahrenheit) for extremely long periods of time, no tempering occurs and therefore the valve continues to reliably operate over extremely long periods of time.

As is well known in the prior art, it is also desired to use dissimilar materials in contact with each other to avoid galling. Therefore, in accordance with one feature of the present invention, one of the two mutually engaging sealing surfaces of the valve, that is, either the manifold block or the slide plate, is plated with a hard finishing material, such, for example, as hard chrome. Both of the surfaces which are mutually engaging to provide the seal are properly ground and lapped to obtain the desired surfaces which will provide effectively the mechanical seal required. Preferably, the surface which is to be plated with the hard chrome is first provided with a finish grind and is thereafter plated to a thickness of approximately to 2 to 3 mils with the hard chrome. Thereafter, the surface is ground and lapped to provide a flatness which is less than 8 light bands over the entire surface and preferably is approximately 2 to 3 light bands of flatness thereover. The finish provided on the surfaces which are mating is less than a 16 micro-inch finish and preferably is approximately a 4 micro-finish. With such flatness and such finish, a seal is obtained through the metal-to-metal contact without the use of any secondary seal of any type.

In accordance with another feature of the present invention and as will be more fully described hereinbelow, in the event the overall surface of the slide plate is not within the optimum flatness range, such may be cured to some degree because of the manner in which the tie rods are disposed so as to apply the desired pressure to the slide valve.

To provide non-galling dissimilar metals so as to permit the slide plate to easily move under normal operating conditions, the backing plate is designed to receive an aluminum-bronze alloy bearing insert against which the slide plate moves during operation thereof.

A plurality of bolts are disposed longitudinally along each side of the slide plate so as to evenly distribute pressure along the slide plate thereby urging the mutually engaging sealing surfaces together to effect the desired seal for the material being processed. Such a feature is not possible in the prior art plug, spool or rotary valve. Each of the tie rods is surrounded with a spacer also constructed of an aluminum-bronze alloy. The surface of the spacers contacts the side edges of the slide plate, thereby maintaining the slide plate in a precise desired position so that the recess in the slide plate properly aligns with the inlet and outlet ports in the manifold block. By providing the spacers of the aluminum-bronze material, dissimilar sliding materials are provided thereby also precluding galling between the slide plate surfaces and the spacers.

As will be recognized by those skilled in the art, it is extremely critical that the upper and lower flat surfaces of the slide plate be parallel to each other and that the opposite sides of the slide plate also be parallel to each other. Such parallelism must be within approximately 1 mil total variation on the upper and lower flat surfaces and within approximately 3 to 4 mils on the sides in order to properly position the slide valve maintain the same in a streamlined condition (elimination of isolated flow areas subject to stagnation) at all times and to preclude seizing or jamming thereof between the backing plate and the manifold block.

It will be recognized by those skilled in the art that upon application of a desired material to be processed under pressure to the diverter valve, there is generated a separating force tending to push the slide plate mating surface away from the manifold block mating surface. This separating force may be easily calculated simply by taking the total area of which the material under pressure is applied and multiplying the same by the pressure of the material being processed. This force must be overcome by applying appropriate counteracting forces through the utilization of the tie rods. It has been found that to properly overcome these forces and to effect the desired seal at the temperatures and under the pressures for which the diverter valves in accordance with the present invention are designed that the forces applied by tightening the tie rods should be approximately 1.6 times the forces generated through application of the material under pressure being processed.

As is well known to those skilled in the art, the pressures of the material being processed may, from time to time, fluctuate either increasing or decreasing. When the pressures increase, they must be absorbed by the material utilized in the diverter valve. It has been found that by utilizing the tie rods constructed in accordance with the present invention, that such tie rods effectively operate as a spring.

DETAILED DESCRIPTION OF THE INVENTION AS ILLUSTRATED

Figure 1:
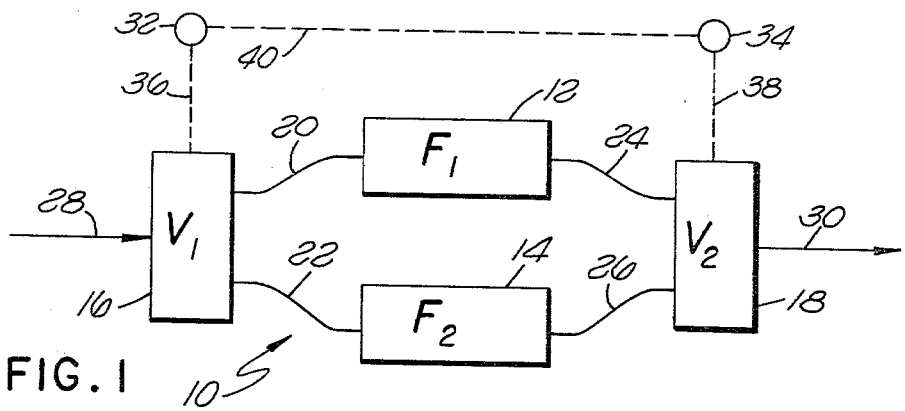
FIG. 1 is a schematic diagram of a system in which a diverter valve constructed in accordance with the present invention is utilized.

By reference to the drawings, and particularly to FIG. 1, it will be seen that a system 10 utilizing the diverter valve of the present invention is generally and schematically illustrated. As is therein shown, a filter F1 and F2 is shown generally at 12 and 14, respectively. The filters 12 and 14 are interconnected to valves V1 and V2 shown generally at 16 and 18, respectively, through the utilization of appropriate conduits such as shown at 20 through 26. A desired material to be processed is applied through the conduit 28 to the inlet diverter valve 16 and leaves the outlet diverter valve 18 by way of the conduit 30 which, in turn, is connected to the desired processing equipment such as an extruder, spinnerette, mold, or the like (not shown). Valve operators 32 and 34 are connected as illustrated by the dashed lines 36 and 38 to the valves 16 and 18 to effect synchronous operation thereof (when such is desired) designated by the dashed line 40 interconnecting the operators 32 and 34.

Figure 2:
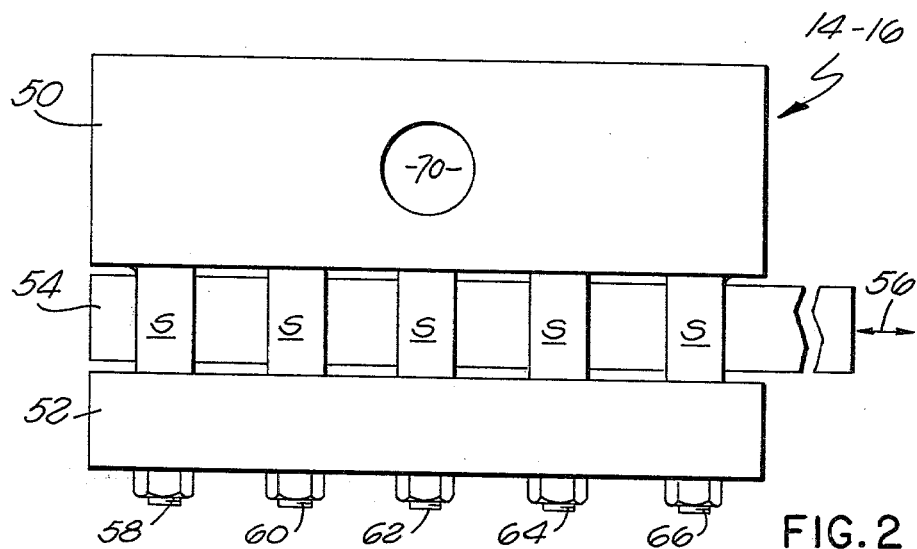
FIG. 2 is a side elevational view of a diverter valve constructed in accordance with the present invention.

As is shown generally in FIG. 2, the diverter valve such as shown at 16 and 18 includes a manifold block 50 and a backing plate 52. A slider plate 54 is sandwiched between the manifold block 50 and the backing plate 52 and is adapted for reciprocal movement as illustrated by the arrow 56. A plurality of the tie rods 58 through 66 are disposed along the length of the slide plate 54 and are connected between the manifold block 50 and the backing plate 52. As above referred to, by disposing a plurality of such tie rods along the longitudinal length of the slide plate 54 an even pressure is applied throughout the operative length of the sealing surface of the slide plate thereby overcoming defects in the flatness of sealing surface of the slide plate 54 which contacts the sealing surface of the manifold block 50. A similar plurality of tie rods are provided on the opposite side of the valve 16/18 as shown more fully in FIG. 5 at 58–66. A guide member or spacer S in the form of a bushing surrounds each of the tie rods for purposes to be more fully explained below.

Figure 3:
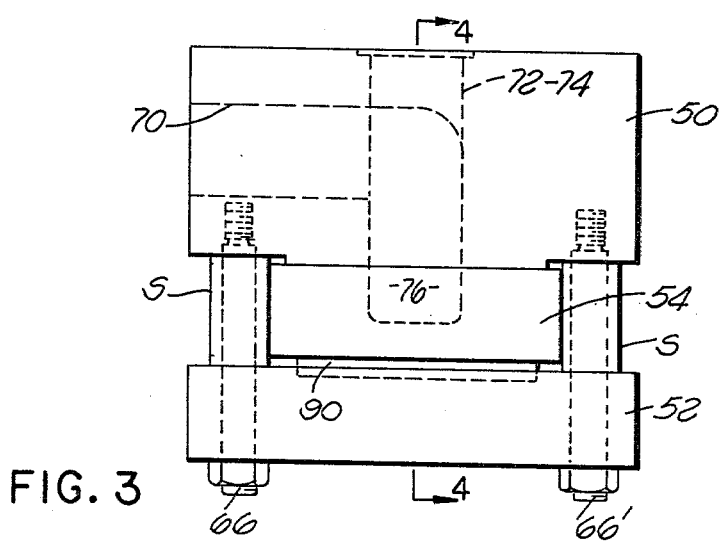
FIG. 3 is an end elevational view of a diverter valve constructed in accordance with the principles of the present invention.
Figure 4:
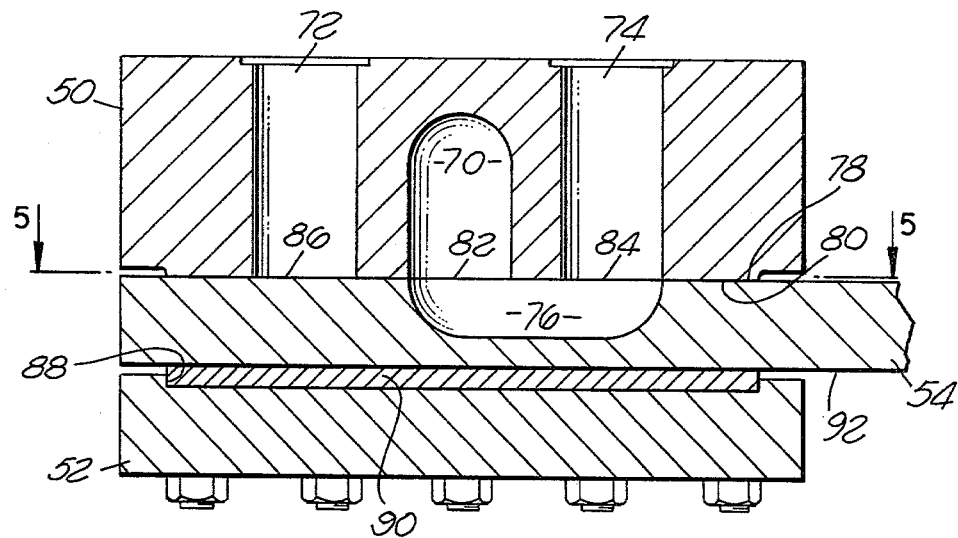
FIG. 4 is a cross-sectional view taken about the lines 4—4 of FIG. 3.

As is illustrated in FIGS. 3 and 4 to which reference is hereby made, the manifold block has an inlet passageway 70 provided therein along with a pair of outlet passageways 72 and 74. A recess 76 is provided in the upper face 78 of the slide plate 54. The recess 76 is designed in such a way that when the slide plate is in one of its limit positions, it exactly coincides with openings or ports provided at the face 80 on the manifold block 50, such, for example, as the ports 82 and 84 for the passageways 70 and 74, respectively. When the slide plate is in the other of its limit positions, the recess 76 would exactly cover the ports 82 and 86. Stops (not shown) may be provided to so position the slide plate. Therefore, it can be seen by those skilled in the art that the material being processed entering the passageway 70 would be diverted to either the passageway 72 or passageway 74, except during the period of time when the slide plate 54 is being translated from one limit position to the other at which time the recess 76 would cover the port 82 and partially the ports 84 and 86 as was well known to those skilled in the art.

As is illustrated, the backing plate 52 defines a recess 88 therein within which is received an insert 90 preferably of an aluminum-bronze alloy which is used as a bearing for the bottom surface 92 of the slide plate 54.

As above described, the surfaces 78 and 80 of the slide plate 54 and manifold block 50, respectively, have applied thereto the desired flatnesses and finishes to effect the metal-to-metal seal so as to preclude the material being processed from leaking therebetween.

Figure 5:
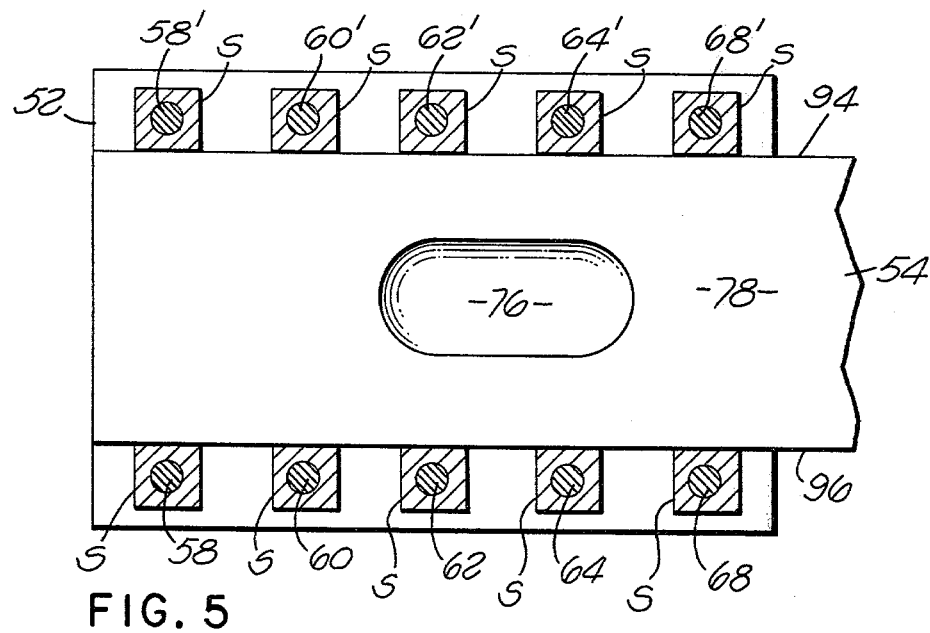
FIG. 5 is a partial sectional view taken about the lines 5—5 of FIG. 4 showing the relationship between the slide plate and the guide members.

By referring now more particularly to FIG. 5 there is illustrated the upper surface of the slide plate 54 with the recess 76 therein along with the tie rods 58 through 68 and the ones on the opposite sides of the valve designated 58' through 68'. As can be seen, particularly in FIG. 4, each of the tie rods is surrounded by the guide-member S. Each of the guides or bushings is preferably constructed of an aluminum-bronze alloy and is in contact with the opposite side edges 94 and 96 parallel to each other, the slide plate 54 is accurately and properly positioned relative to the manifold block so that recess 76 always mates with ports 82 and either 84 or 86 depending upon the limit position of the slide plate 54.

It will be noted by those skilled in the art that when comparing the ports 82, 84 and 86 with the recess 76 along with the manner in which the passageways 70, 72 and 74 are constructed that there is no isolated area within or adjacent the flow path where the material being processed can stagnate. That is, the process material upon entering the diverter valve flow directly through the flow paths in the valve without encountering any isolated flow areas where the flow of the material will stop or stagnate.

There has thus been disclosed a highly reliable diverter valve useful at high temperatures and high pressures for processing viscous materials, particularly monomers and polymers which may also be very corrosive.

What is claimed is:

1. A slide plate diverter valve for use with high viscosity fluids at temperatures in excess of about 400 degrees Fahrenheit and pressures in excess of about 1000 PSI comprising:

a unitary manifold block capable of withstanding temperatures in excess of about 400 degrees Fahrenheit and defining fluid inlet and outlet flow areas and having a first sealing face, said flow areas defining inlet and outlet ports at said first sealing face;

a unitary metallic slide plate capable of withstanding temperatures in excess of about 400 degrees Fahrenheit and defining a fluid flow passageway in one surface thereof for receiving the fluid flowing through said inlet flow area and diverting the same to said outlet flow to provide a continuous flow path for said fluid having no isolated regions subject to stagnation, said one surface having a second sealing face;

a metal backing plate capable of withstanding temperatures in excess of about 400 degrees Fahrenheit and with said slide plate sandwiched between said backing plate and said manifold block; and means for applying a clamping pressure to said manifold block and said backing plate to urge said first and second sealing faces into metal-to-metal sealing engagement with sufficient force to preclude leakage of said fluid therebetween at pressures in excess of about 1000 PSI.

2. A slide plate diverter valve for use with high viscosity fluids at temperatures in excess of about 400 degrees Fahrenheit and pressures in excess of about 1000 PSI comprising:

a metallic manifold block defining fluid inlet and outlet flow areas and having a first sealing face, said flow areas defining inlet and outlet ports at said first sealing face;

a metallic slide plate defining a fluid flow passageway in one surface thereof for receiving the fluid flowing through said inlet flow area and diverting the same to said outlet flow to provide a continuous flow path for said fluid having no isolated regions subject to stagnation, said one surface having a second sealing face;

said slide plate having first and second flat opposed surfaces and first and second opposed side edges, said flat opposed surfaces being substantially parallel with each other and said side edges being substantially parallel with each other;

a metal backing plate with said slide plate sandwiched between said backing plate and said manifold block; and a plurality of resilient members connected between said manifold block and said backing plate for urging said first and second sealing faces into metal-to-metal sealing engagement.

3. A diverter valve as defined in claim 2 wherein said resilient members are a plurality of tie rods disposed in equal numbers on each side of said slide plate.

4. A diverter valve as defined in claim 3 which further includes guide means engaging said opposite side edges of said slide plate.

5. A diverter valve as defined in claim 4 wherein said guide means includes a separate bushing surrounding each of said tie rods.

6. A diverter valve as defined in claim 5 wherein said tie rods each includes means for adjusting the force urging and sealing faces into sealing engagement and wherein said means for adjusting is set at about 1.6 times the force generated by the pressure of fluid in said flow path acting against the area of said slide plate.

7. A diverter valve as defined in claim 2 wherein said metal backing plate defines a recess therein and which further includes a bearing member received within said recess.

8. A diverter valve as defined in claim 7 wherein the area of said first sealing face is less than the area of said first flat surface on said slide plate and the area of said bearing member is less than the area of said second flat surface on said slide plate.

9. A slide plate diverter valve for use with high viscosity fluids at temperatures in excess of about 400 degrees Fahrenheit and pressures in excess of about 1000 PSI comprising:

a metal manifold block defining fluid inlet and outlet passageways therethrough and having a first sealing face, said passageways having ports at said first sealing face;

a metal slide plate defining a fluid flow passageway in one surface thereof and a second sealing face on said surface, said slide plate being movable between first and second limit positions for diverting fluid flow between said passageways, the outer periphery of said passageway in said slide plate substantially conforming to the outer periphery of said ports through which fluid is flowing to substantially eliminate isolated regions in the fluid flow path for fluid stagnation to occur;

a metal backing plate with said slide plate sandwiched between said backing plate and said manifold block; and a plurality of resilient members connected between said manifold block and said backing plate for urging said second sealing face into metal-to-metal sealing engagement with said first sealing face.

10. A diverter valve as defined in claim 9 wherein said resilient members are a plurality of tie rods disposed in equal numbers on each side of said slide plate.

11. A diverter valve as defined in claim 10 which further include guide means engaging said opposite side edges of said slide plate.

12. A diverter valve as defined in claim 11 wherein said guide means includes a separate bushing surrounding each of said tie rods.

13. A diverter valve as defined in claim 12 wherein said tie rods each includes means for adjusting the force urging said sealing faces into sealing engagement and wherein said means for adjusting is set at about 1.6 times the force generated by the pressure of fluid in said flow path acting against the area of said slide plate.

14. A slide plate diverter valve for use with high viscosity fluids at temperatures in excess of about 400 degrees Fahrenheit and pressures in excess of about 1000 PSI comprising:

a metallic manifold block defining fluid inlet and outlet fow areas and having a first sealing face, said flow areas defining inlet and outlet ports at said first sealing face;

a metallic slide plate defining a fluid flow passageway in one surface thereof for receiving the fluid flowing through said inlet flow area and diverting the same to said outlet flow to provide a continuous flow path for said fluid having no isolated regions subject to stagnation, said one surface having a second sealing face;

said sealing faces being constructed of hot work tool steel which has been hardened, tempered and nitrided with said nitriding extending into said sealing faces for a distance of about 0.010 inches;

said sealing faces having a flatness over their entire surfaces of less than about 8 light bands and a finish of less than about 16 micro-inches;

one of said sealing faces being plated with a dissimilar metal to eliminate galling;

a metal backing plate with said slide plate sandwiched between said backing plate and said manifold block; and means for applying a clamping pressure to said manifold block and said backing plate to urge said first and second sealing faces into metal-to-metal sealing engagement.

15. A slide plate diverter valve for use with high viscosity fluids at temperatures in excess of about 400 degrees Fahrenheit and pressures in excess of about 1000 PSI comprising:

a metallic manifold block defining fluid inlet and outlet flow areas and having a first sealing face, said flow areas defining inlet and outlet ports at said first sealing face;

a metallic slide plate defining a fluid flow passageway in one surface thereof for receiving the fluid flowing through said inlet flow area and diverting the same to said outlet flow to provide a continuous flow path for said fluid having no isolated regions subject to stagnation, said one surface having a second sealing face;

said slide plate having first and second flat opposed surfaces and first and second opposed side edges, said flat opposed surfaces being substantially parallel with each other, and said side edges being substantially parallel with each other;

a metal backing plate with said slide plate sandwiched between said backing plate and said manifold block; and means for applying a clamping pressure to said manifold block and said backing plate including a plurality of resilient members connected therebetween to urge said first and second sealing faces into metal-to-metal sealing engagement.

* * * * *